(12) United States Patent
Sprague

(10) Patent No.: US 7,753,615 B1
(45) Date of Patent: Jul. 13, 2010

(54) TELESCOPING RACKING SYSTEM WITH RAMPS AND PLATFORMS

(76) Inventor: Donald G. Sprague, 420 Wiscasset Rd., Whitefield, ME (US) 04353

( * ) Notice: Subject to any disclaimer, the term of this patent is extended or adjusted under 35 U.S.C. 154(b) by 989 days.

(21) Appl. No.: 11/257,168

(22) Filed: Oct. 24, 2005

Related U.S. Application Data

(60) Provisional application No. 60/621,569, filed on Oct. 22, 2004.

(51) Int. Cl.
*B60P 9/00* (2006.01)
(52) U.S. Cl. ............................. 403/346; 296/3; 410/32; 224/405
(58) Field of Classification Search ................. 403/169, 403/287, 289, 346; 296/3, 26.09; 410/32, 410/42; 224/403, 405
See application file for complete search history.

(56) References Cited

U.S. PATENT DOCUMENTS 2,676,044 A * 4/1954 Gorman et al. ............. 403/346

* cited by examiner

*Primary Examiner*—Stephen Gordon
(74) *Attorney, Agent, or Firm*—Stan Jones, Patents

(57) ABSTRACT

Long load racking system for vehicles, adjustable runners horizontal and vertical with telescoping members—both single rail, double rail; and trombone shaped; multi-functional, split and corner couplings with accessible transverse to coupling base friction adjustments, ramping ground to bed and bed to elevated locations.

8 Claims, 15 Drawing Sheets

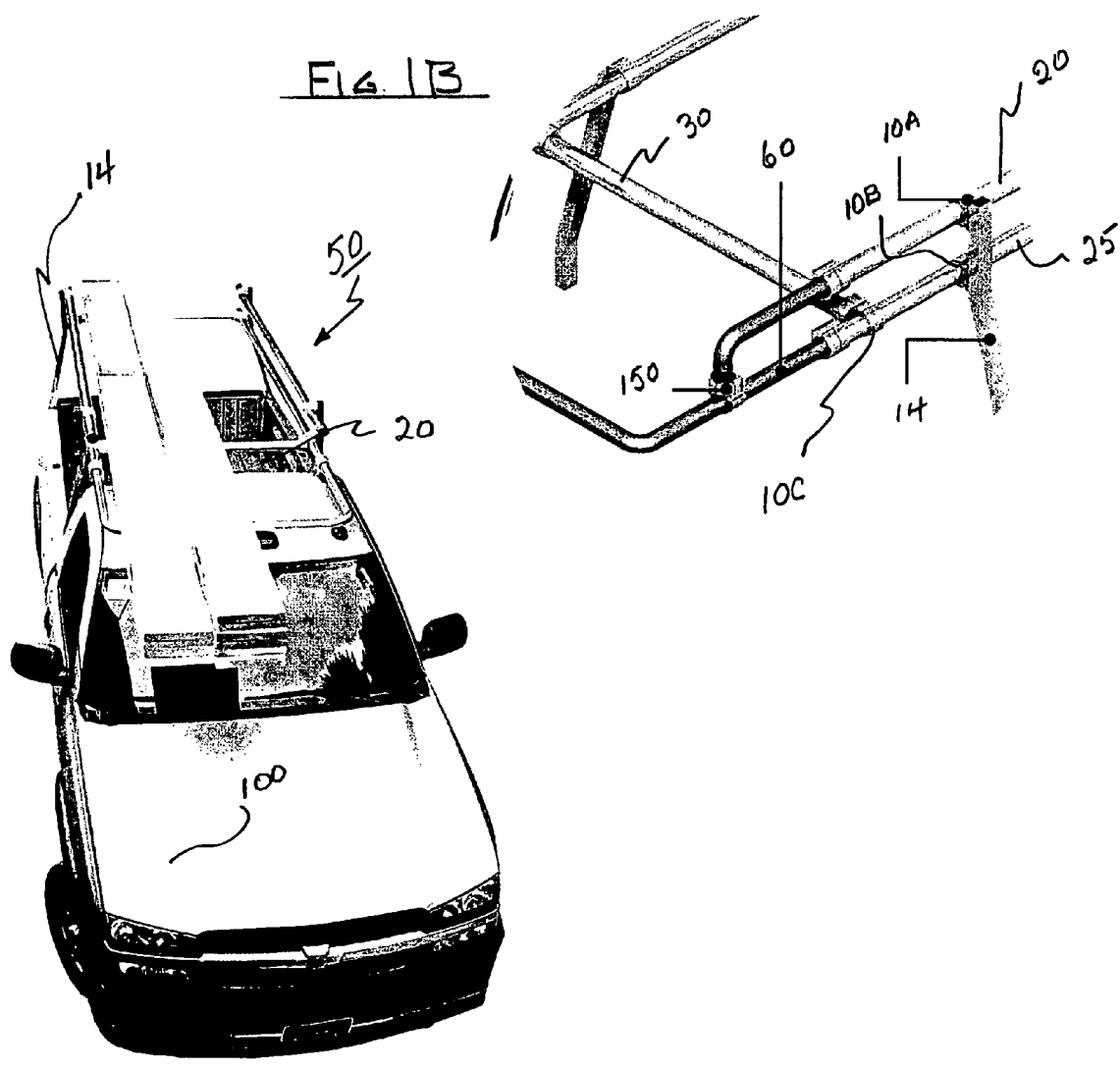

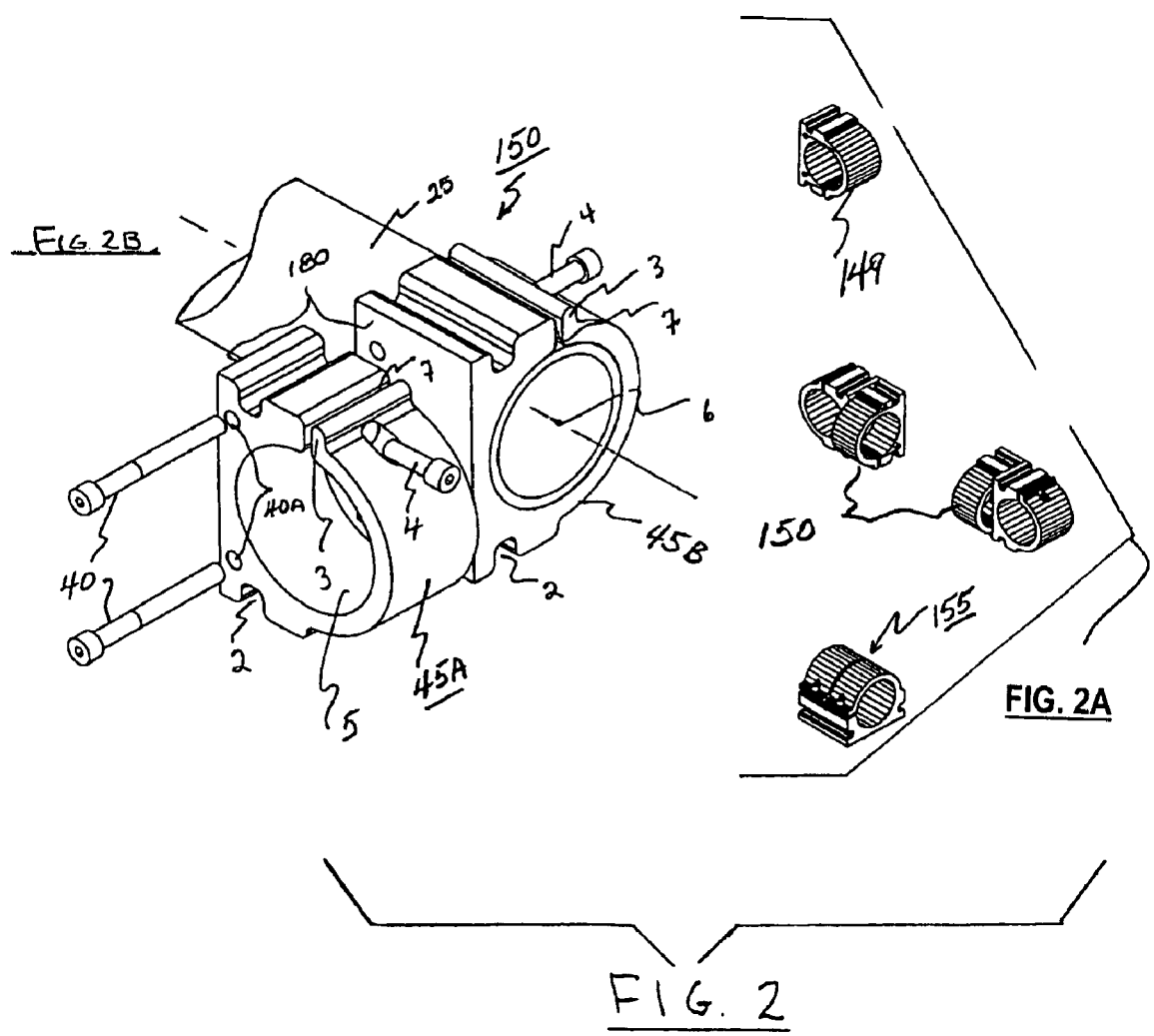

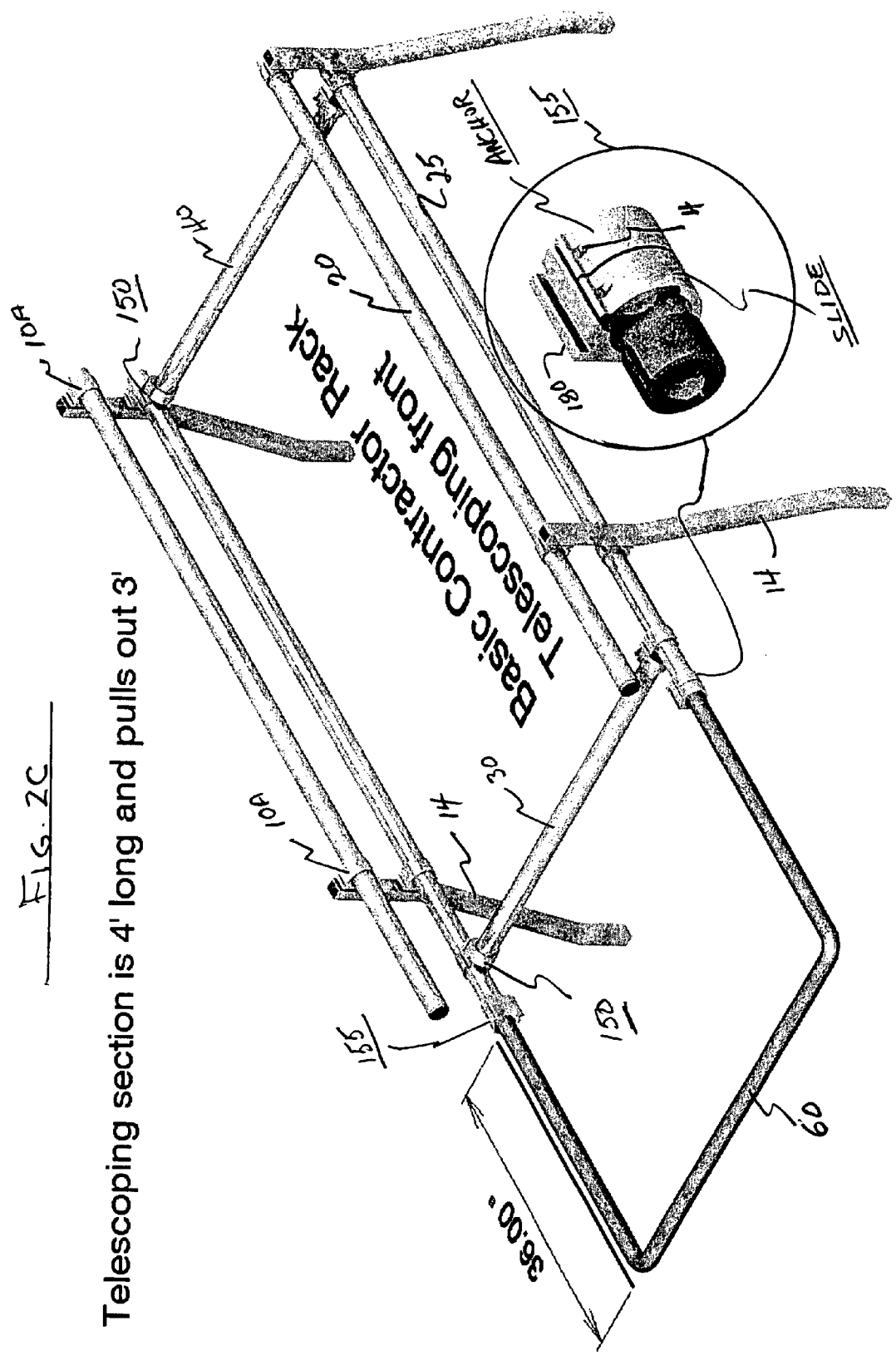

TELESCOPING RACKING SYSTEM WITH RAMPS AND PLATFORMS

PREVIOUS FILING INFORMATION

On Oct. 22, 2004 the United States Patent Office received a copy of—and assigned Ser. No. 60/621,569 to—a Provisional Patent Application (PPA) filed by the same inventor hereof. That PPA is incorporated herein by this reference as though set out here in full. Additionally, the PPA is being supplemented by this Regular Patent Application (RPA). Applicant expressly reserves all rights and privileges flowing from the PPA and its earlier official filing date and contents thereof. This RPA follows, and it is supported by the PPA.

Additionally the invention employs to advantage my novel coupling clamps which are depicted and claimed in my pending application entitled FREE SWINGING PORTABLE CUTTING WORK STATION having Ser. No. 10/458,837 filed on Jun. 12, 2003. Particular attention is called to FIG. 7 of that application. That application is incorporated herein as though set forth in full at this point.

BACKGROUND OF THE INVENTION

1. Field of the Invention

The field of the invention is truck racking systems and more particularly to an improved product and method for enhancing trucks with a racking system of increased versatility and structural novelty. This rack system invention provides a versatility and utility not shown or suggested by any known prior art. Indeed, the racking system of this invention fulfills a long felt need in a novel manner not provided by any known products in the marketplace today.

The invention allows contractors to use racks on pickups and compact, regular and large size trucks for safely carrying a wide assortment of extra long supplies and products. Painters carry long ladders and poles, plumbers carry long pipes and carpenters carry long boards, and the like. On job sites the trucks equipped with my invention can be used for a myriad of tasks such as loading and unloading supplies to/from decks and roofs and for scaffolding purposes along walls being constructed, painted or repaired.

2. Description of Prior Art

The uses of pickup trucks are widespread, and a growing trend for the proud owners of such vehicles is to make them very "dressy". Thus, commercial demand says that such trucks must look customized as well as be practical for a myriad of uses. In order to increase the hauling versatility, such vehicles have long been equipped with standard racks that are supported above the bed of the truck by known racking posts.

Most pickup trucks have stake pockets located around the sides and corners of the truck body, or "bed". These pockets surround the periphery of the loading bed of the truck. It is known to insert straight or inwardly angled steel posts into such pockets, which posts carry well known racking systems of the prior art. In conventional prior art designs the rack runners across the bed width and the runners lengthwise along the bed length are bolted or welded directly to the top ends of the four uprights. In either case, however, the prior art structure presents a loss of interchangeability, flexibility and degradation in the strength of the various rack members.

The prior art racks extend above the bed and generally co-exists above the footprint of the bed. There is little in the way of flexibility and no telescoping involved in such prior art. Should such a prior art rack extend beyond the bed outline, as per Track-Racks.com, it does so as a fixed in place cantilever without any telescoping features. Instead, it is simply bolted as a fixed cantilever rack marginally over the cab. At most this over-the-cab extension might go forward only three feet over the cab. In my telescoping invention I can extend up to about seven feet over the cab and hood. The new and novel racking system of this invention also employs risers that fit in the stake pockets just as in the prior art.

In the invention, however, I have developed angled risers which may be turned so as to sweep inwardly or outwardly depending upon the particular configuration of the novel adjusting, pivoting and telescoping of this racking invention. Please note that the outwardly slanting uprights allow a plank to be placed close to a wall or similar immovable structure for added user convenience and safety purposes. With the prior art straight uprights the truck mirrors and other side protrusions prevent the workers from getting very close to buildings with such prior art rack systems.

In summary, the prior art devices are characterized by a limited range of use and suffer severe limitations for long items. Moreover, the prior art racks do not telescope.

We have all seem what that brings into play. The length limitation of standard racks means that extra long items in the prior art are haphazardly tied down with ropes or twine. Such an approach—particularly with do-it-yourselfers—creates extreme safety hazards. Indeed, many times flexible long items are draped over the windshield area and are tied to the front bumper rearview mirrors or other vehicle parts not intended for such uses.

What has not yet been provided, prior to this invention, is a versatile, personalized racking system as first disclosed and claimed herein. The invention is characterized by the key features of a custom "select, erect and customize" your own personalized rack configuration for the needs and style that suits you, the user. Telescoping capability of this racking invention is a first in the truck cargo racking industry. Moreover, the materials used and the rack configurations are both stylish and functional beyond any racks known in the art.

DEFINITION OF SOME RELEVANT TERMS

Set out below are brief descriptions of certain relevant terms which further the understanding of the invention. These terms provide a basis for a detailed teaching of the improvements of this invention in the relevant arts. Such terms are not intended to replace the claims but rather serve as helpful guides in understanding my novel improvements in these arts.

Telescoping Members

Each racking embodiment utilizes the feature of telescoping rack extensions. The tube members for the invention are selected from standard aluminum or stainless steel pipes that are known in the art as 2 inch pipe (2.375 inch O.D.) diameter, for full sized trucks, or 1½ inch pipe (1.900 inch O.D.) for compact trucks. The telescoping inside part is always approximately ½ inch less in diameter leaving about 0.05 inch diameter clearance between the sliding and "fixed" or outside telescope members. Such pipes are available right off the supply chain and thus contribute to a cost saving feature when compared to the prior art welded square steel racks.

Rack System Couplings

My coupling devices are smooth and easy to adjust for one functional mode to another. In cross section my base, collar and rib forming my multifunction coupling is essentially a ribbed circular omega. This unique shape contributes to function and design and to safety purposes as well. One side of the omega collar has been slotted and the other side acts as a limited movement manually adjustable spring for controlled compression of my circular collar surrounding my racking system pipes.

The mounting and adjustment fasteners—including my friction adjustments that control the coupling collar compression—are rounded and knurled for either finger or Allen wrench control. Collar tightening adjustment bolt(s) are transverse to the base and access is readily adjustable for transforming my novel racking systems components as the job at hand dictates.

Split Coupling for Telescoping

My split coupling is used everywhere a telescoping rack section is present and the rack pipes reduce in size from 2 to 1½ inch diameter. This split coupling employs two co-axial omega collars formed on a solid base. Accordingly, two separate fastening modes are manually achieved by selective friction adjustment on either or both parts of the split coupling collar(s) on the solid base. The coupling part holding the smaller sliding rack section includes a collar spacer insert (preferably of PVC or the like) that takes up the 0.05 inch diameter clearance between the telescoping members.

SUMMARY OF THE INVENTION

The racking system of this invention employs riser upright posts that fit in the stake pockets just as in the prior art. Such risers may be turned within their receiving pockets so as to sweep inwardly or outwardly depending upon the particular configuration of the novel racking system. Coupling attachments per se separate the rack runners lengthwise and cross wise from the uprights. Split couplings are present at the telescoping junctions.

Structural tubing of aluminum or stainless steel pipe is preferred for the racking system of the invention. The novel racking system has tubing connections provided with novel adjustable clamps and collars that allow right angle and in-line connections, together with adjustability and telescoping via my new and novel split coupling. No welding is required thus providing additional versatility and interchangeability of parts and structural members.

Connected to such uprights are receiver attachments (couplings) for receiving, supporting and holding in place adjustable connections for rack members. Such "couplings" in turn are themselves fastened to the top end of the upright posts and carry horizontal side to side, and forward to rearward pipe members that define the novel and versatile rack systems provided by the invention.

In the basic configuration of the invention stainless steel posts with either aluminum or stainless steel rails essentially fit the footprint of the pickup bed. The forward and/or rearward tube members may be fitted with end caps as a decorative and sound reducing feature. The strength and power of the invention, however; comes from pipe members carried by couplings that receive telescoping side runners. These telescoping members fit within the coupled side runners and may be extended forward and/or rearward a considerable length for the purpose of carrying extra long loads.

Such racking system as claimed also includes adjustable cross pieces for receiving and holding platform or "plank" sections that may be loaded across the system. Such cross pieces function as a scaffold for worker ease in contractor/homeowner uses on job sites. Such plank sections, of course, are well known but the invention enhances their effectiveness by providing novel ramping connections that facilitate and support ramps within and without the truck bed. Greater versatility for their use is thus achieved by the invention.

In keeping with the variable recreation, residential and commercial construction requirements of today, the racking system invention further comprises platform sections that may be loaded from the ground into the rear of the pickup bed by virtue of a novel tailgate attachment. And ample headroom is provided for loading ATVs, lawnmowers, powered or non powered construction equipment and the like into the bed of a truck outfitted with my invention.

In order to enhance safety and ease in such ground-to-bed loading/unloading, the invention employs a rear cross piece that swings clear from the side runners. Thus, the rearmost cross piece securely latches over one side runner, while its other end is swiveled by my coupling to the opposing side runner. Such connections allow the cross piece to be rotated in place for enhanced stability. Or, it may be pivoted out of the way for headroom and equipment clearance during a loading/unloading process.

The drawing, pictures, and photographs associated with this application are believed sufficient to depict, describe and support claims to the novel features of this invention. Such features include a racking system for connection to the top end of raised upright posts that are inserted into stake openings in a pickup bed and include a novel and new product and method.

The novel features of the disclosed invention provide many novel benefits. Achieved by this invention are some of the following features and benefits as summarized below:

Lightweight and readily transportable.
Readily available for easy adjustment and reconfiguration as loads and uses demand.
Easy to set up and/or takedown.
Easy to reconfigure as on the job requirements dictate.
Provides a wide variety of telescoping uses in a simple affordable racking system.
Easy adjustment of multifunction coupling attachments.
Coupling attachments for reduction from 2 inch to 1½ inch pipe types.
Ramping functions with tailgate attachments for ground to bed and bed to plank requirements.
Easy hauling of extremely long loads with improved safety and appearance.
Flexibility for compact truck usage.
Nylon/PVC insert in split couplings.
Schedule 10 or 40, extruded aluminum and/or stainless steel finishes.
Other features as set forth herein.

DRAWINGS

FIG. 1 is a top perspective view of a truck and enlarged details of the rack invention in use as shown by FIGS. 1A and 1B in accordance with the invention;

FIG. 1C on a separate drawing sheet is an embodiment that more clearly depicts the telescoping feature and a split coupling with a reducing insert feature of my novel telescoping rack system.

FIG. 2 includes FIG. 2A and FIG. 2B wherein FIG. 2A is a collection of clamp variations that show how one collar is used in various configurations to formulate the various embodiments of the racking invention, and FIG. 2B is an partially exploded view showing two of my couplings joined as a corner clamp;

FIGS. 2C and 3 depict perspective views of some of the basic building blocks for the invention in the form of a basic rack that includes the hollow pipes and my capability to receive telescoping rack extensions of various configurations as shown and described hereinafter;

Figure 7:
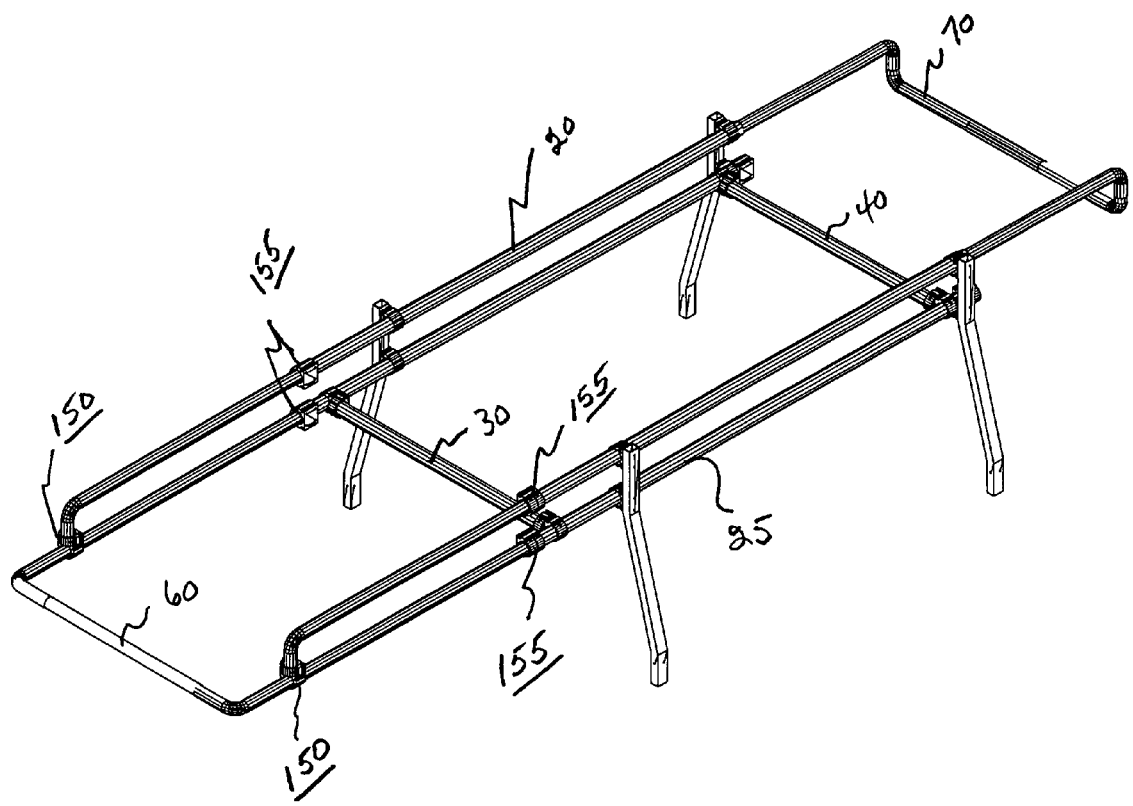
FIG. 7 depicts a perspective view of yet another embodiment having double rails a telescoped extension forward over the cab area and additional rack support structure both fore and aft in accordance with the invention.
Figure 8:
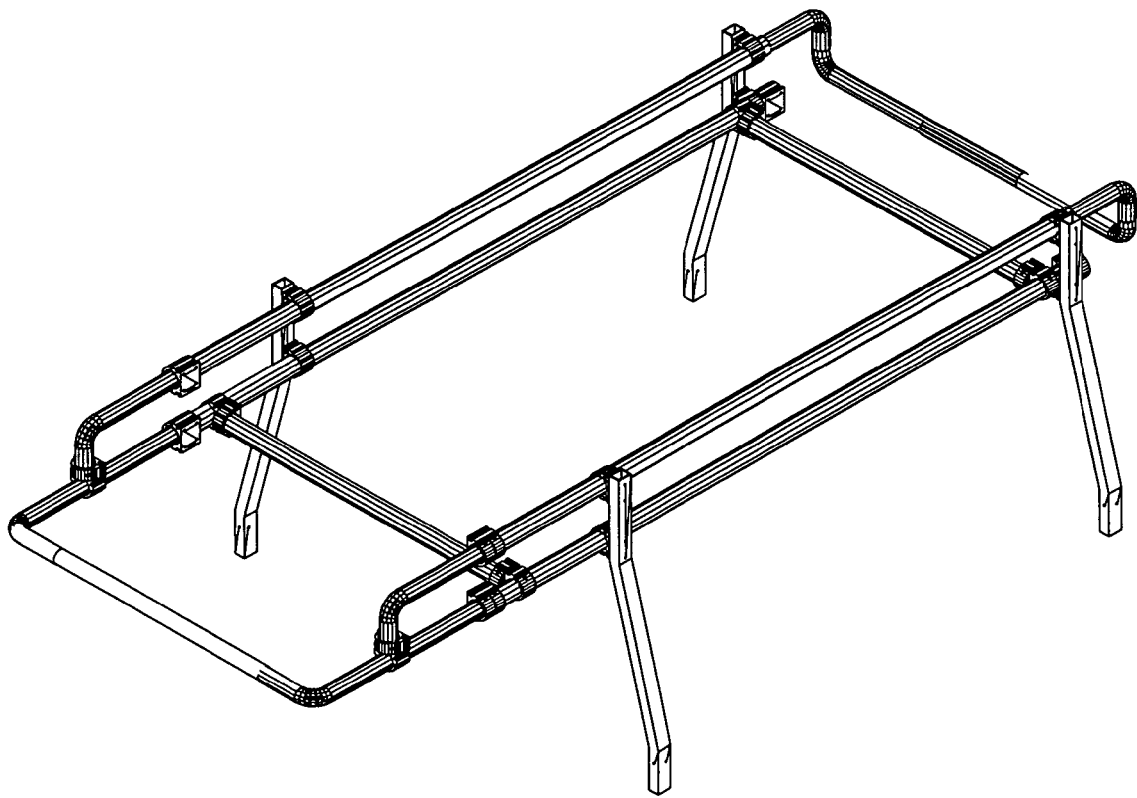
FIG. 8 depicts the embodiment of FIG. 7 with the telescoped members returned and parked in the withdrawn position in accordance with the invention.
Figure 9:
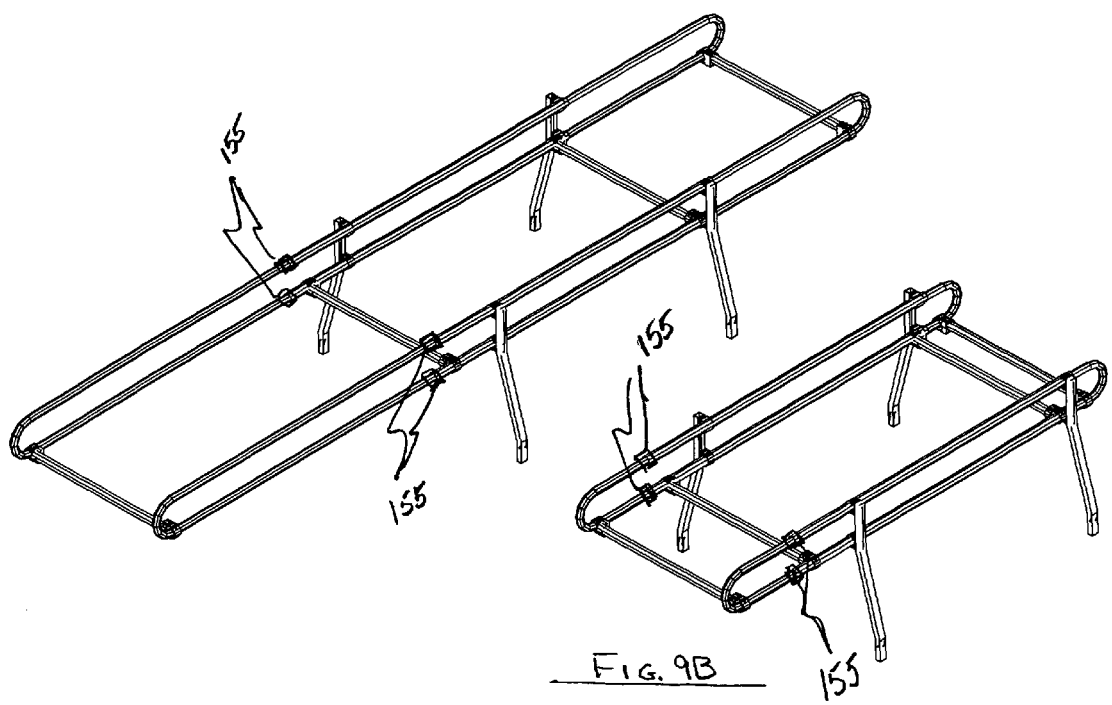

FIG. 9 includes FIGS. 9A and 9B which are long and short embodiments, achieving functions similar to that of FIGS. 7 and 8 wherein the double rails take the form of a trombone shaped railing system.

Figure 10:
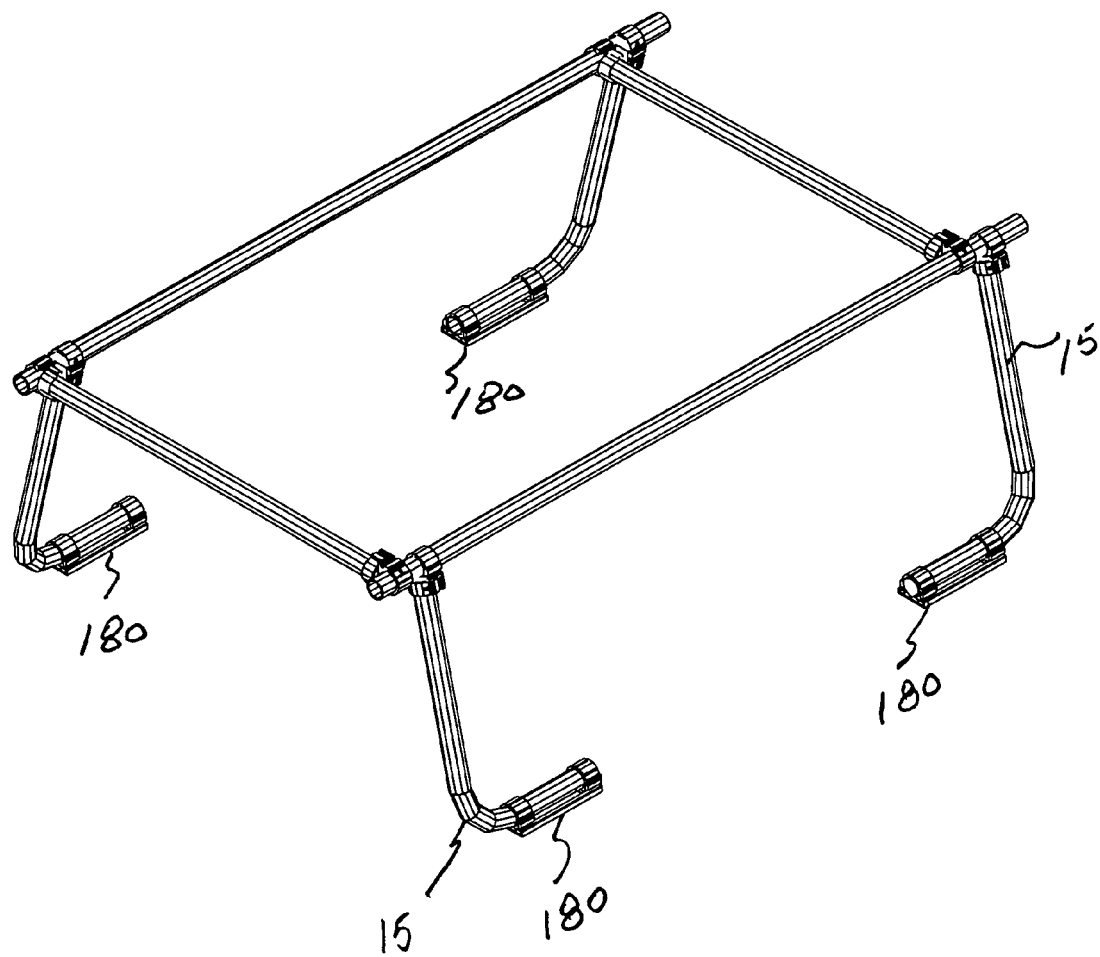
Figure 11:
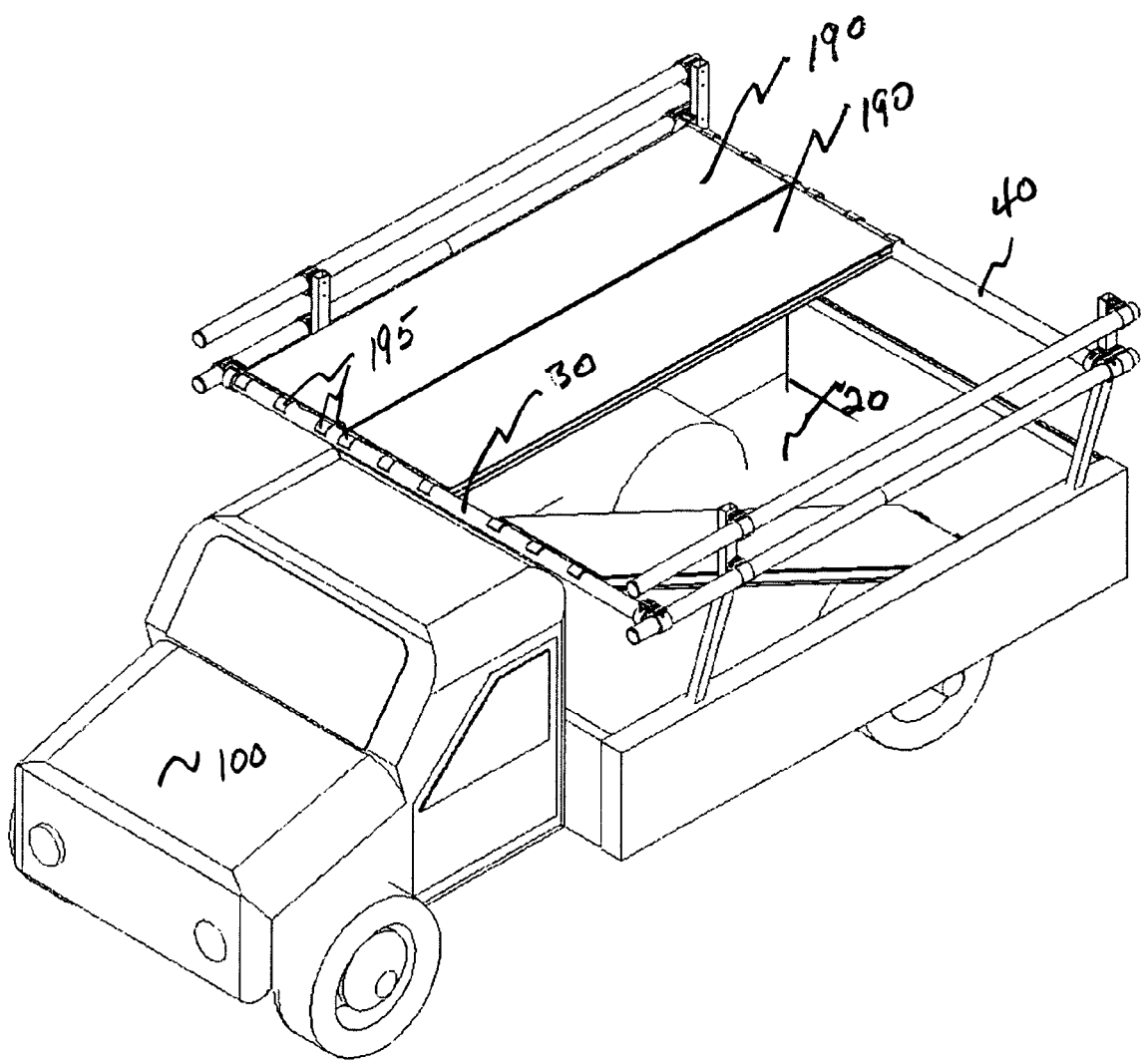
Figure 12:
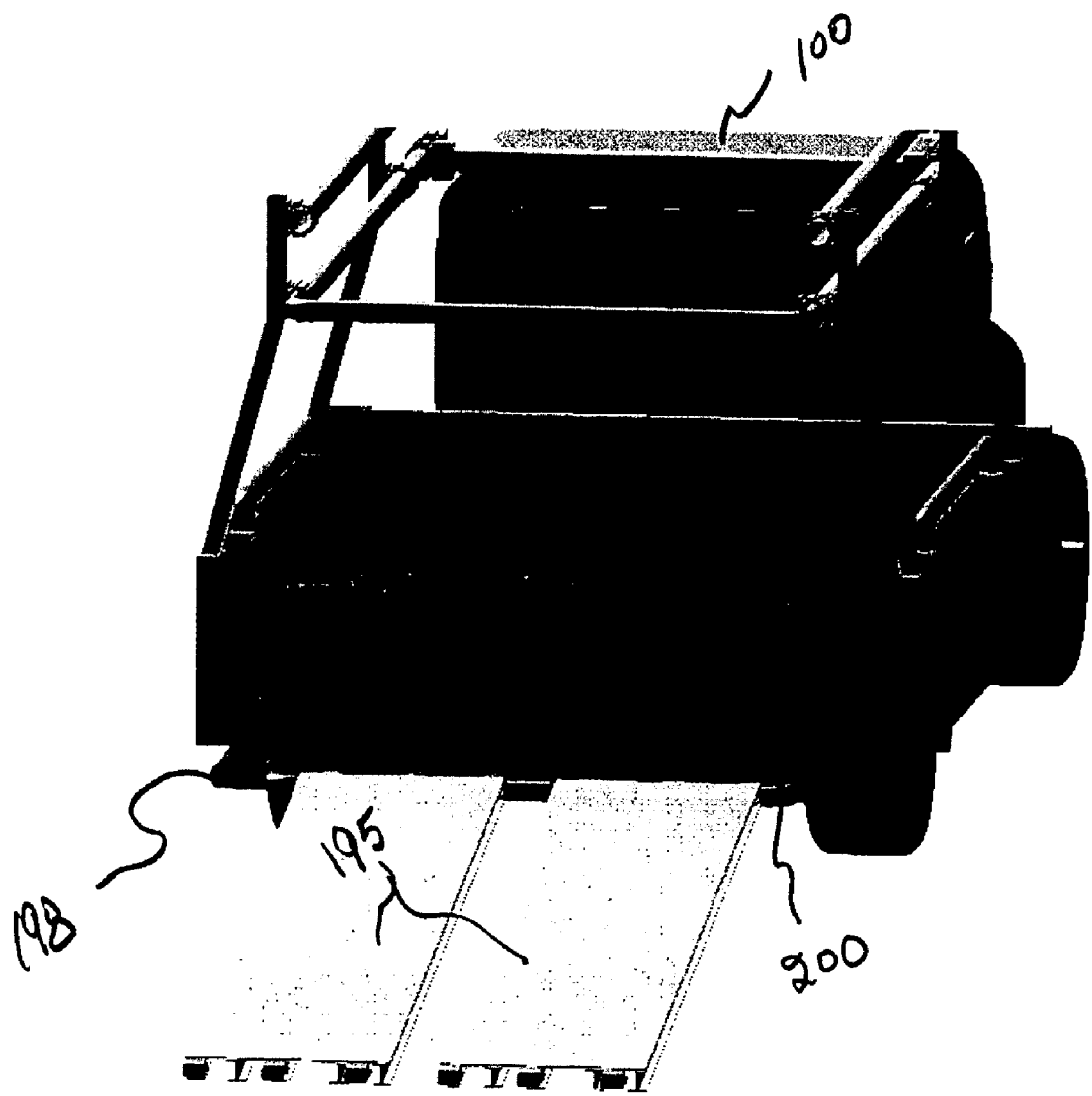

FIG. 10 is another additional embodiment wherein attachment plates are provided for the top side rails of a pocketless truck box and the uprights are formed from curved pipes;

FIG. 11 depicts in highly symbolic form one embodiment for the platforms and ramps as used in accordance with the invention;

FIG. 12 show a rear perspective of the invention having a pair of wide racks as another inventive option allowing one to load equipment from the ground to the bed. This inventive embodiment includes a dropped tail gate and my tail gate bracket mount for a ground/bed/ground ramp.

Figure 13:
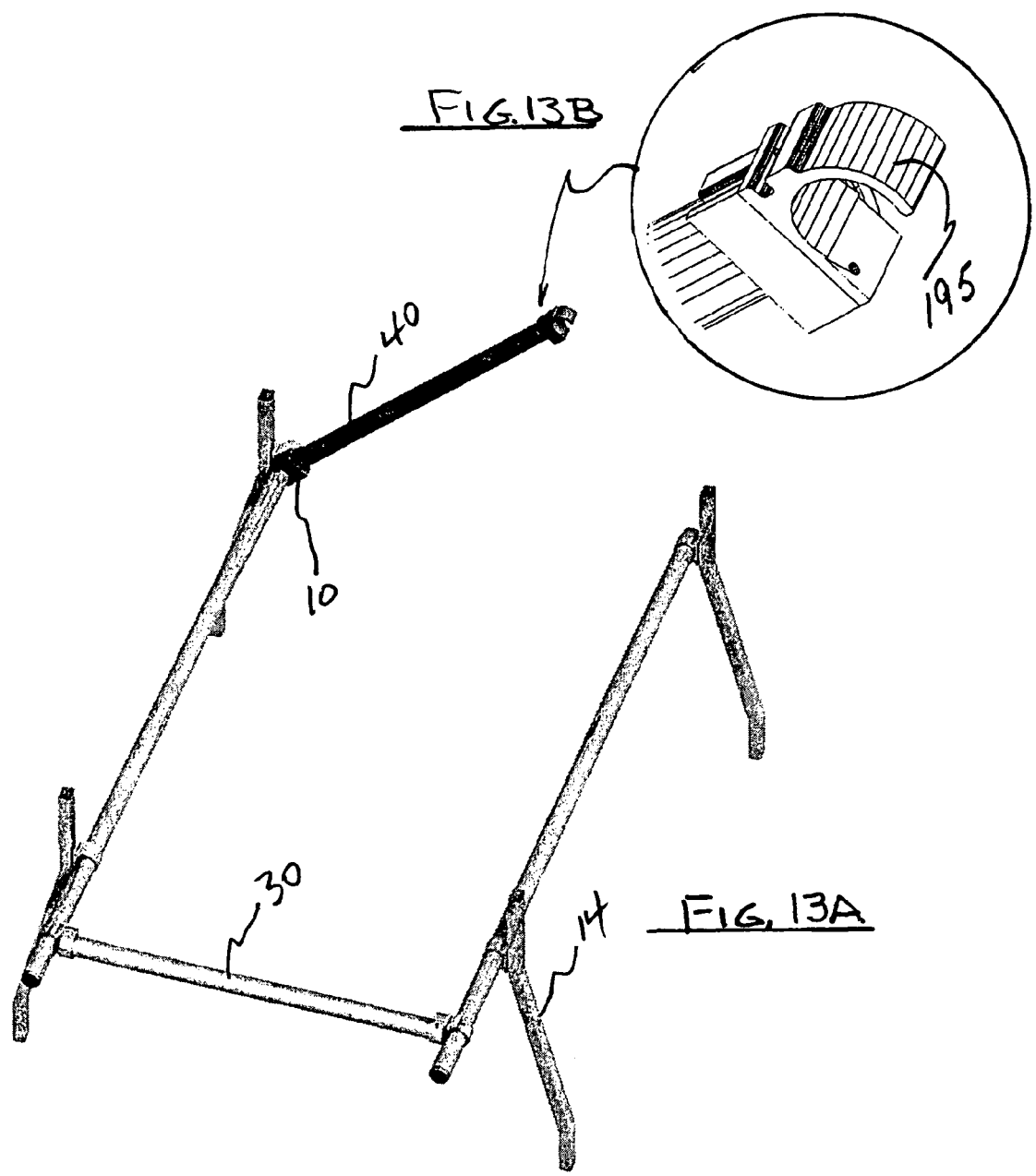
Figure 14:
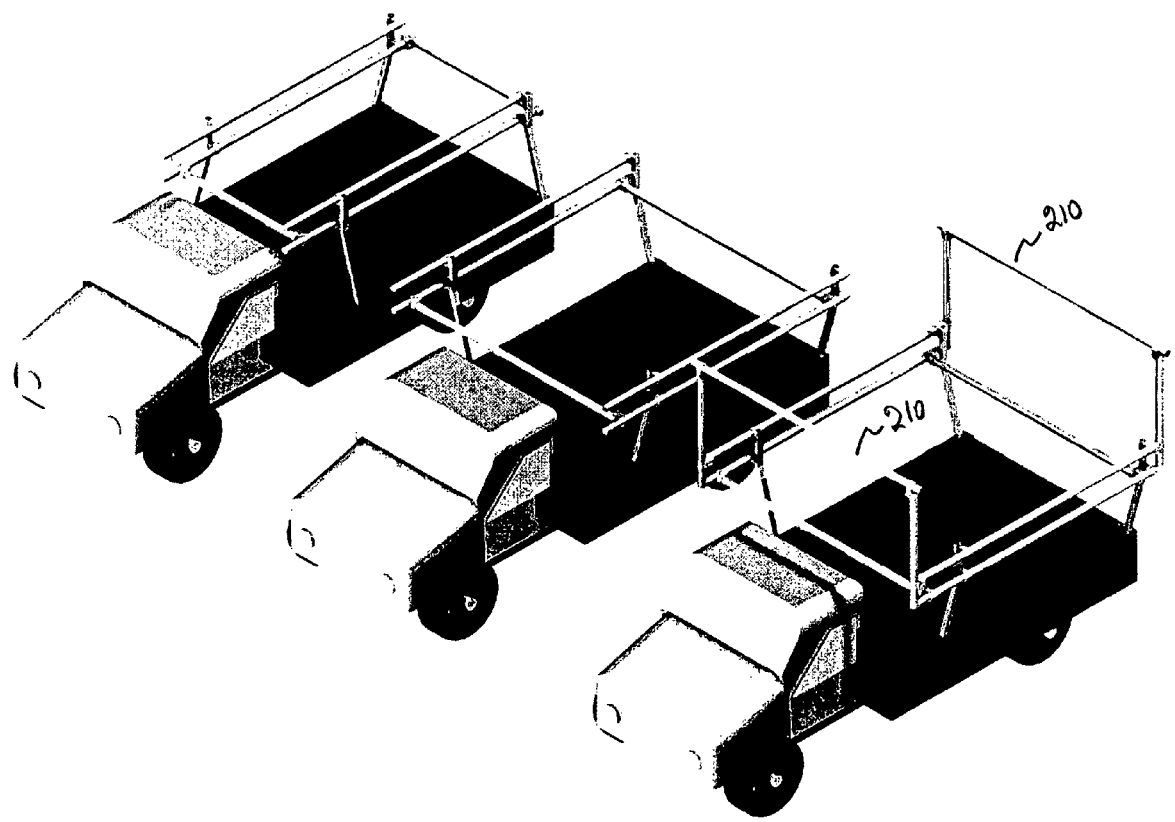

FIG. 13 includes FIG. 13A and an enlarged 13B as top perspectives that are useful in explaining a pivoting clearance rail useful in loading from a ground to a bed via the ramp feature of FIG. 12; and FIG. 14 is an alternate embodiment very useful for painters since my couplings allow the racks an upward extension.

DETAILED DESCRIPTION OF THE PREFERRED EMBODIMENT

Figure 5:
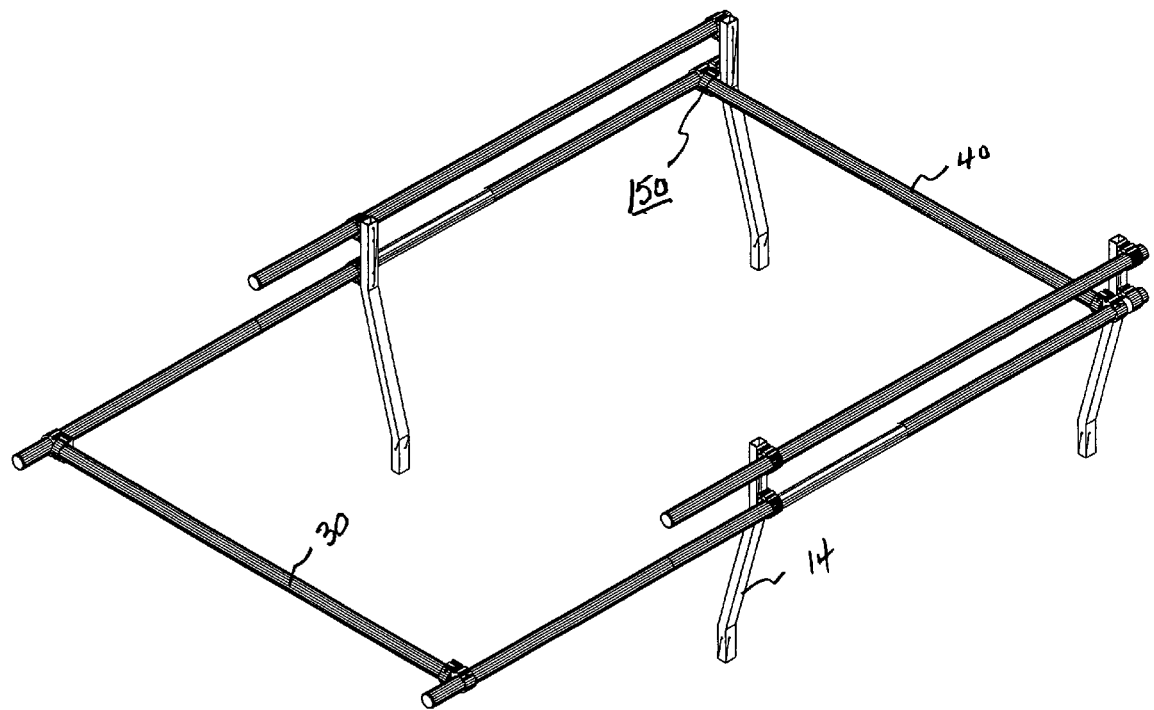
FIG. 5 depicts a perspective view of another embodiment having rearmost double rails in which a single forward cross member is adjustable and slides back and forth over the cab area in accordance with the invention.

FIG. 1A depicts a regular sized pickup 100 having one of my inventive racking systems 50 in place on the bed 20. As there depicted, inboard slanting upright posts 14 have been inserted in the pockets of bed 20. (An outward slanting post 15 is shown in FIG. 5 to be described later). The post slant determines the width for my narrower or wider racking systems.

This FIG. 1 embodiment is a typical example of my novel to racking system selections. It is referred to as a deluxe unit. The rearmost "over the bed part" of the rack 50 may advantageously be fabricated from 2 inch schedule 40 aluminum pipe supported in position by circular pipe openings in a plurality of couplings 10. Each of my rack systems use a number of such couplings 10 that are configured for different functions in accordance with the rack type under consideration.

As is obvious from a closer study, one will note in FIG. 1 that my coupling 10 is repeated in many locations throughout the rack system 50. Such couplings are all of the same basic shape and only the functions that they accomplish varies depending upon their position and fabrication for my given rack models. Such couplings 10 are extruded from aluminum stock material, and they make a decidedly and relatively inexpensive—yet highly versatile—building block throughout my various rack models.

In FIG. 1B one can see a vertically oriented pair of couplings 10, namely 10A and 10B, which pair is bolted or otherwise suitably fastened to spaced openings in the top of upright post 14. These couplings support the upper and lower rails 20 and 25 respectively. Just forward of that coupling pair and holding forward cross rail 30 in a rigid, but adjustable, position is another coupling assembly 10C. This coupling 10C is actually a pair of my couplings connected together base to end and forming a corner coupling assembly 150.

FIG. 2B includes an enlarged view of a partially exploded corner assembly 10C. In FIG. 2B a base to end junction of my individual coupling units is achieved by knurled threaded assembly fasteners 40. In this view one coupling 45A is joined with another to coupling 45B to form a corner assembly 150.

Coupling 45 has formed there through a pair of slightly oversized bore holes 40A (relative to the shaft diameters of fastener bolts 40). These oversized fastener openings are parallel to the base is 180 and are located in the shaded quadrant area above the coupling base 180 and slightly below inwardly directed grooves 2. Ribs 3 are just above a slot 7, which slot 7 yields or springs back slightly for controlled tension around rail pipe 25. The function for my couplings 10 depends upon the rack selection and is readily achieved by simply tightening or loosening my transverse-to-the-base tensioning screw 4.

I use split couplings 155 in several embodiments and always at every telescoping junction. Thus, in FIG. 1B both the upper and lower rails 20 and 25 carry my split coupling 155 at the sliding member telescope junction as rail 25 steps down from 2 inch rail pipe to the smaller sliding telescoped 1½ inch diameter of front telescope slide 60. In my method of use, the craftsman tightens the anchor part of split coupling 155 on the larger pipe rails 20 (both sides of the rack) and loosens the smaller diameter slide member on both side rails of the system. The user then manually pulls the front telescoping slide 60 forward and tightens the slide tension adjustment screw 4 on the slide part of the split coupling. The reverse step follows a reverse procedure.

Figure 3:
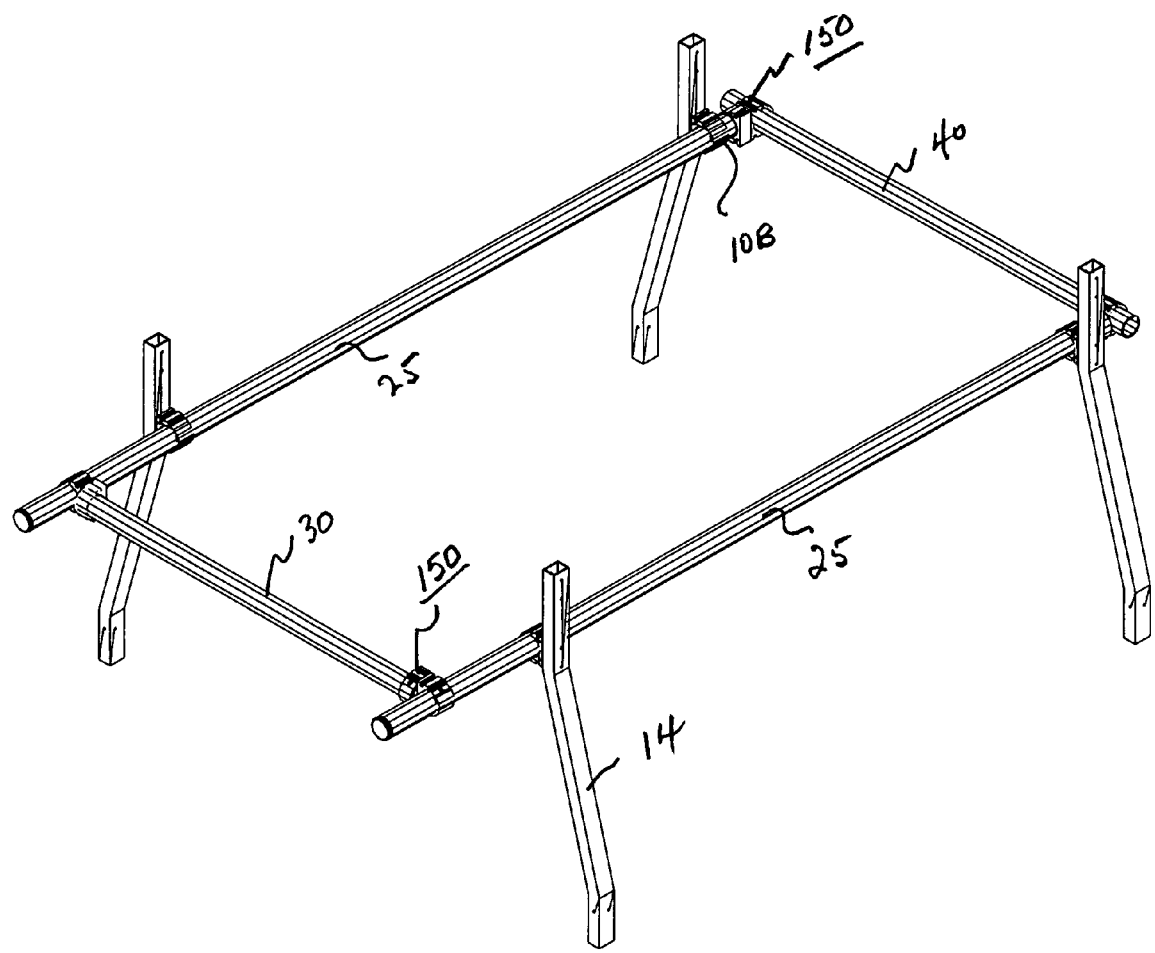
Figure 4:
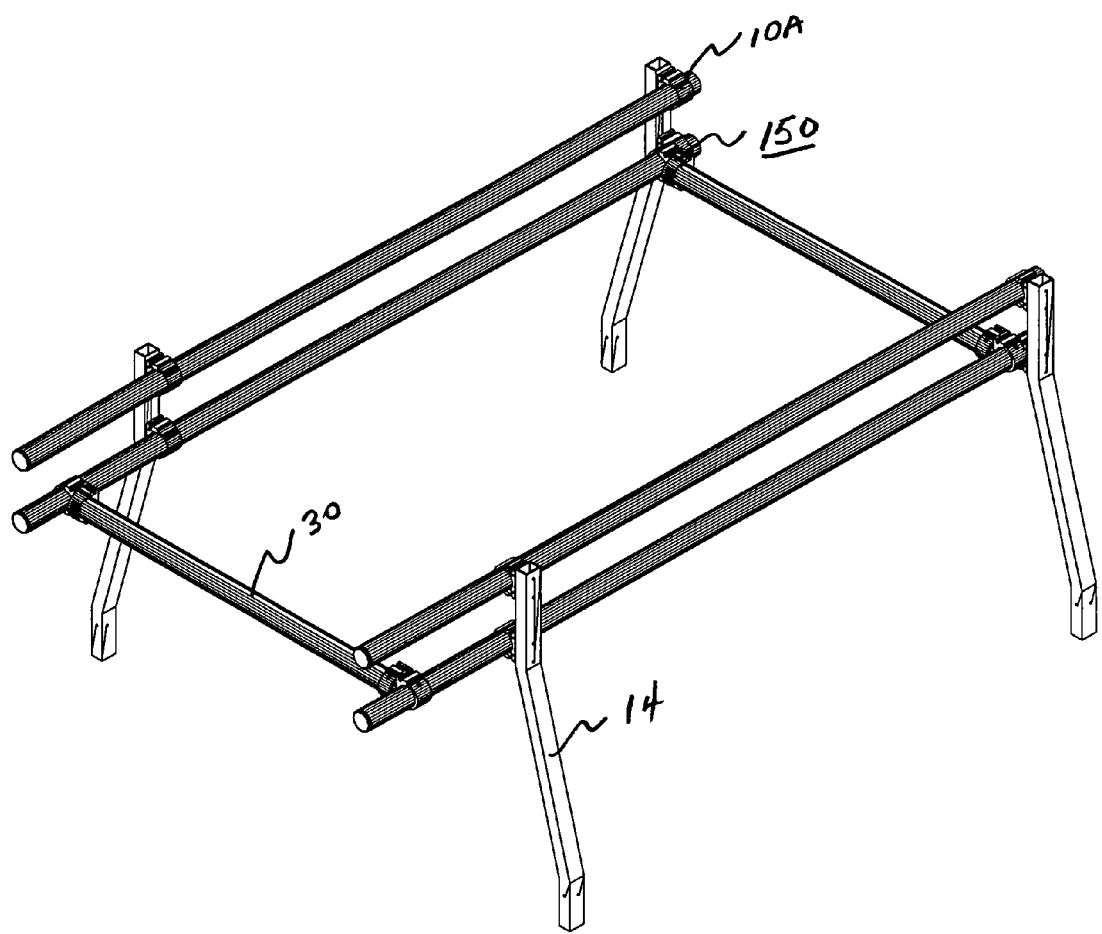
FIG. 4 depicts a perspective view of another embodiment having double rails and telescope receiving capabilities in accordance with the invention.
Figure 6:
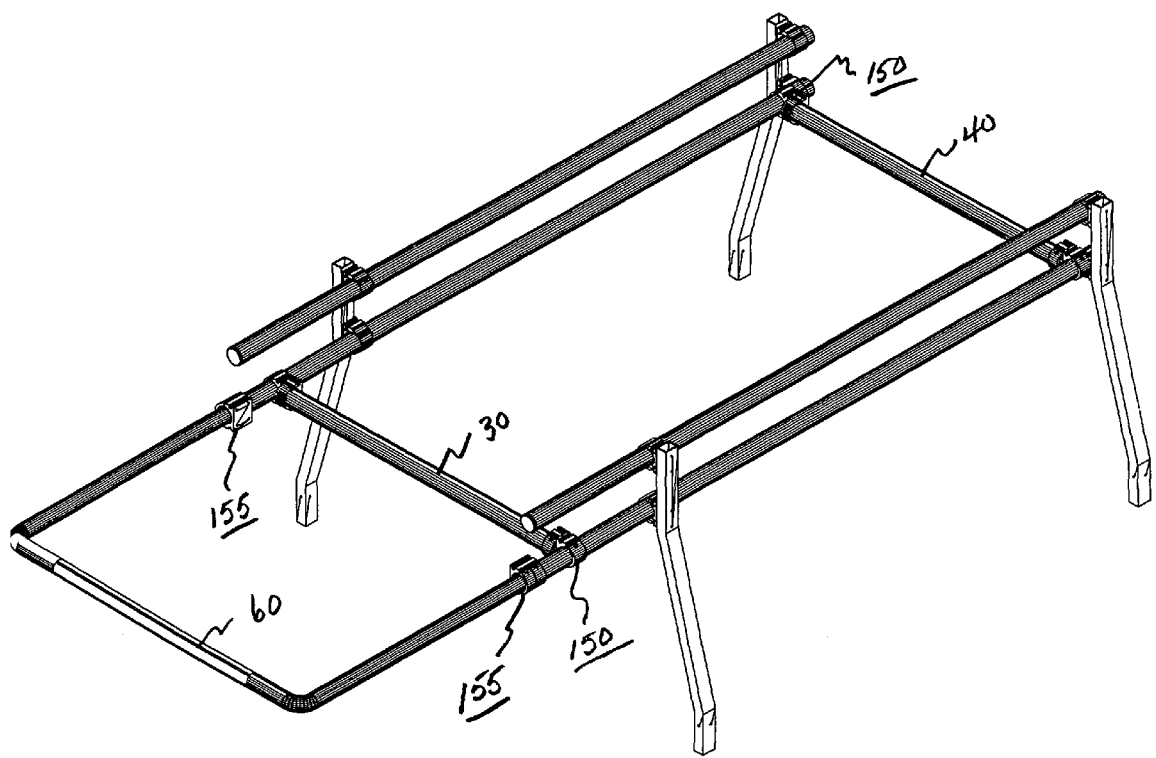
FIG. 6 is an embodiment advance of that of FIG. 5 and depicts a perspective view with the rack, having double rails, an adjustable cross rail and a telescoped extension well forward over the cab area in accordance with the invention.

FIGS. 3, 4, 5 and 6 will be described together in this section of the application since the operational principles have already been covered by the earlier descriptions. Thus, FIG. 3 is essentially the lower rack portion of FIG. 2C and need not be described in detail in view of the foregoing description. The same couplings, rails and cross bars described in connection with FIG. 2C are employed in FIGS. 3, 4 and 5 with like numbered elements achieving same functions as earlier described. FIG. 6 is the same as FIG. 2C and thus has already been sufficiently described. The double rail rack of FIG. 4 includes an additional upper rail pair 20 further racking capability.

FIG. 5 is referred to as a farm or ranch rack and is particularly useful for bulky relatively lightweight loads such as hay, insulation, foam planks, plastic conduits. I have used my outwardly slanted upright posts in order to increase the hauling capacity for such materials. Again please note that the outwardly slanting uprights allow a plank to be placed close to a wall or similar immovable structure for added user convenience and safety purposes. With the prior art straight uprights the truck mirrors and other side protrusions prevent the workers from getting very close to buildings with the prior art rack systems. Again cross rail 30, upon selective user adjustment slides back and forth. Every similarly located coupling unit need not be numbered in every Figure since it is believed that persons of ordinary skill in this art will readily understand their functions in view of the earlier descriptions herein.

FIGS. 7 and 8 are taken together and are mostly self explanatory in view of the earlier descriptions of operation for the earlier figures. In FIGS. 7 and 8 it should be noted that the rack invention includes an optional upper railing that parallels the first lower railing. Both of these parallel railing pairs have been equipped with telescoping members. Lower rail 25 has a forward telescope slide 60 whereas upper rail pair 20 has a rear telescoped slide 70 with a dropped rear cross pipe to increase the rack length for carrying long loads across a common horizontal load plane. Lower rail 25 includes a front telescope slide 60 and in this rack model upper and lower pairs of split couplings 155 are employed. Additional front support is provided by upper rail 20 bending down to connect with telescope slide 60 via a corner assembly 45 as earlier described in connection with FIG. 1B.

Very heavy loads may be placed on the telescoped end of the rack system of FIG. 7 without fear of bending or breaking the rack system. An extreme overhang of the forward telescoped slide 60 of the rack proper extends load support out almost to the hood end of a truck so equipped. This forward overhang is a decided point of departure from the prior art and provides added versatility to the invention. FIG. 8 is the same rack as that of FIG. 7 with the telescoped slides parked or withdrawn. It is likewise very strong and rigid. FIG. 8 is not believed to require any further description.

FIG. 9 includes FIGS. 9A and 9B which are telescoped and parked or withdrawn embodiments, achieving functions similar to that of FIGS. 7 and 8 wherein the double rails take the form of a trombone shaped railing system. The trombone double rail also presents a stylish look for that certain market segment. This is considered to be the strongest of the rack systems, but may be less costly to manufacture.

FIG. 10 is another additional embodiment wherein two pairs of attachment plates 180 are provided for the top of both sides of a truck box that may not have any stake pockets. The uprights 15 of FIG. 10 are formed from curved pipes of the type described herein. Otherwise the earlier descriptions are believed self sufficient as explanation of this racking system.

FIG. 11 depicts a symbolic line drawing of a truck and "planks" or "platforms" 190 that are known to the art and are available for use to great advantage with my telescoping rack system invention. These platforms 190 are carried by my couplings that have a lower section of the circular collar segment removed to fabricate semi-circular hooks 195. (Please see FIG. 13B.) These hooks 195 drop snuggly in place over cross piece 30 of any of my rack systems. Sliding and fastening the positions for my various cross pipes 30 and 40, as described herein, readily allows such planks 190 widespread usage throughout my various model rack systems. This FIG. 11 also depicts that selected sections of my platforms 190 may be dropped at one end into the truck bed 20 for additional load moving freedom.

Platforms 195 are very handy for contractors since the height of the truck and my rack system elevates workers far above the ground on a secure and moveable base. A fine example is FIG. 14 wherein the rack invention has been extended upwardly for a higher platform for painters. FIG. 14 is believed self explanatory Also note the fact that such platforms 195 may be hooked in the manner herein describe over the elevated cross rails 210. Obviously the platforms 195 will span rails 210 and form a high scaffold for painters, roofing contractors and the like.

When platforms 195 are removed from my rack system and placed from the rear of the pickup bed 20 to the ground, loading of supplies, various vehicles, tools and equipment is greatly facilitated. FIG. 12 show such an application. Examples of use for sportsmen are the ease and capability to load ATVs, motorcycles, wheelbarrows etc. from the ground into the pickup bed.

When one intends to load an ATV, for example, into the pickup bed along a platform 195 from the bed to the ground, the invention provides another feature wherein the tailgate 198 is equipped by a rail accessory 200 that fits to the top of the tailgate. My semicircular hooks 195 again drop over the pipe 200 attached to the tailgate 198 and provide a long incline ramp from the ground into the bed 20 of pickup 100.

A still further advantage of my racking system is shown in FIG. 13 wherein the rearmost cross rail 40 is fitted with a snap hook 195 at one end as depicted in the enlarged view of FIG. 13B. A loose swivel or hinge connection is provided by coupling 10 around the rear end of a rail 20. These connections allows the rear cross piece to drop down over the tail end of one the said rails in one position and be removed from that rail in another pivoting position. Such rotation as shown in FIG. 13 allows the cross rail 40 to swing upward and swivel out of the way as needed to clear the way for headroom into the bed 20 during the example of an ATV loading process.

While my invention has been described with reference to particular examples of some preferred embodiments, it is my intention to cover all modifications and equivalents within the scope of the following claims. It is therefore requested that the following claims, which define my invention, be given a liberal interpretation commensurate with my contribution to the relevant technology.

What is claimed is:

1. A collared coupling for a circular pipe rack system for rail material selected from standard aluminum or stainless steel pipes including 2 inch diameter pipe (2.375 inch outside diameter) or 1½ inch diameter pipe (1.9000 inch outside diameter); said pipe rack system comprising:

a pipe collar of a given width having a circular pipe-shaped opening adapted to fit on said rail material and centered on a longitudinal axis through said collar, said collar being of an extruded aluminum material, and comprising, when viewed in cross section, a flat base surface below said opening together with an integrally curved circular segment of said collar material above and surrounding said opening;

a pair of longitudinal grooves in each surrounding side of said collar material, with said grooves being substantially equal in depth and located immediately above said flat base;

said grooves continuing upwardly into a pair of opposed side ribs spaced equally opposite each other on opposite sides of said collar; and a slot above one of said side ribs and cut through said collar material from an outside completely through to the circular opening.

2. The coupling of claim 1 and further comprising said coupling in cross section is essentially a ribbed circular omega shape having said flat base, said collar with the opening matching the outside shape of said rail material with one side of said omega shaped collar slotted through said collar and another side acts as a limited movement manually adjustable spring for controlled compression of said collar around said rail material.

3. The coupling of claim 1 and further wherein said coupling includes adjustment fasteners allowing a user to control friction adjustments by increased or decreased collar compression.

4. The coupling of claim 3 and further wherein
one of said tightening adjustment fastener has an axis that is transverse to the base surface and spans said slot whereby sliding access for a rail is readily adjustable to a rack user to tighten or loosen said collar.

5. The coupling of claim 3 and further wherein
said coupling employs a second collar, each said collar being coaxial, omega shaped, and formed on a solid base; and wherein individual fastening modes are manually achieved by selective friction adjustment on either or both collars on said solid base.

6. A collar in accordance with claim 1 and further comprising:
an additional rib along a radius of curvature of said coupling and located above said slot.

7. A coupling in accordance with claim 6 and further comprising:
transverse openings adjacent said radius of curvature and extending into said additional rib.

8. A coupling in accordance with claim 6 in combination with another collar, said combination comprising:
a base of said another collar connected to an end of said first recited collar with said base surface of said first recited collar aligned with an end of said another collar; and
bolt means joining said collars together to form a corner collar unit.

* * * * *